W. HECKERT.
SPEED INDICATOR.
No. 188,738.          Patented March 27, 1877.
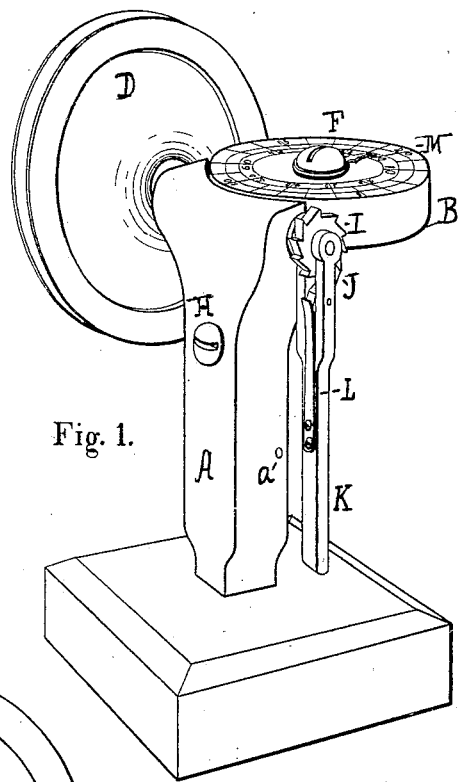
Fig. 1.
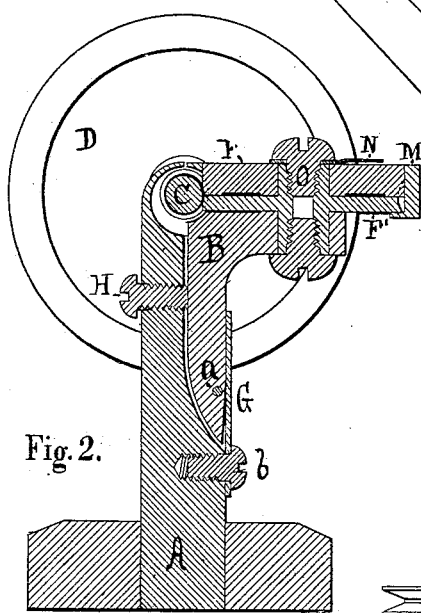
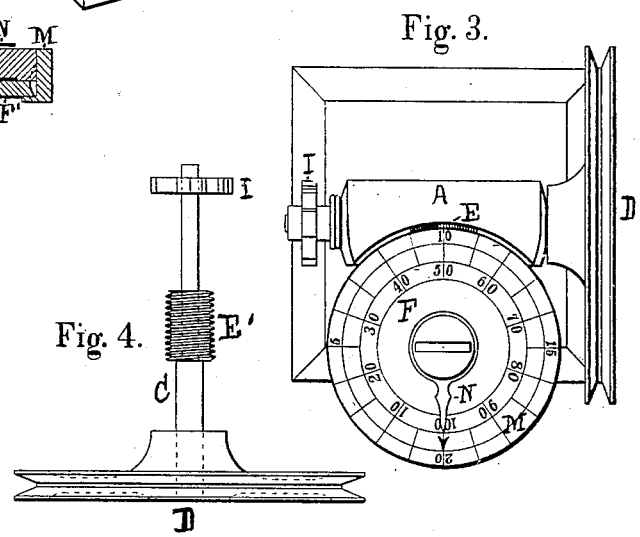
WITNESSES.          INVENTOR.

UNITED STATES PATENT OFFICE.

WILLIAM HECKERT, OF PROVIDENCE, RHODE ISLAND.

IMPROVEMENT IN SPEED-INDICATORS.

Specification forming part of Letters Patent No. 188,738, dated March 27, 1877; application filed November 24, 1876.

*To all whom it may concern:*

Be it known that I, WILLIAM HECKERT, of the city and county of Providence, in the State of Rhode Island, have invented a new Improvement in Measuring and Counting Attachments for Machinery; and declare the following to be a specification thereof, reference being had to the accompanying drawing.

Like letters indicate like parts.

Figure 1 is a perspective view of my invention. Fig. 2 is a vertical section of the same. Fig. 3 is a top plan. Fig. 4 is a detail view.

My invention is, in part, an improvement upon, and embodies some of the characteristics of, the invention described in Letters Patent No. 144,985, granted November 15, 1873, to Thomas K. Keith and A. Seaver.

My invention consists, essentially, in hanging a dial-bracket upon a pivot, and making the same adjustable by means of a spring and set-screw to adapt the gearing to varying pressures, as may be required, and also in furnishing the spindle which carries the worm with a fixed ratchet-wheel and oscillating arm, the latter being provided with a pawl, by which vibrations or revolutions of any part of the machinery connected therewith may be accurately registered.

The standard A supports the bracket B, which is hung upon a pivot, a, within a longitudinal slot made to receive it. The standard A also furnishes bearings for the spindle C, which passes through it from side to side. A pulley, D, with a grooved rim, is fastened upon the spindle and revolves it, as hereinafter shown. The spindle C carries a fixed worm, E, which gears into the teeth of the dial-wheels F F′ to turn them. The gearing of the dial-wheels and worm is brought into contact and engagement by means of the spring G, which is affixed to the standard A by the screw b, and the free end of which spring bears against the bracket B above the pivot a. The force of this spring is regulated by the set-screw H, which, passing through the standard A, bears against the rear side of the bracket B, and determines to what depth or with what degree of pressure the gearings shall be engaged. This device, as thus far described, constitutes the measuring attachment. For the purpose of counting oscillations or revolutions of parts of machinery, the spindle C is operated by a ratchet-wheel, I, fastened thereto, which ratchet is advanced by the pawl J. The pawl is hung upon or within the oscillating arm K, and is kept in engagement with the ratchet by the spring L, as shown in Fig. 1. The arm K moves loosely on the spindle C, and its lower or free end is connected, in any suitable manner, to that part of the machinery of which the movements are to be recorded. The measurement or record is read from the dial M and face of the dial-wheel F. Any of the well-known devices for registering revolutions may be used for the purpose. That shown in the drawing consists of two wheels, F F′, having a differential gearing, driven by the worm E. The index N shows the revolutions of the inner wheel F′, being connected therewith. The wheels shown in the drawings are so arranged that one entire revolution of the worm E advances both wheels F F′, respectively, to the distance of one of their cogs. In an entire revolution of the wheel F′, which registers one hundred revolutions of the spindle C, it gains one notch on the wheel F, which moves upon the screw O as its center, and thus the whole number of the revolutions of the spindle C is registered upon the dial.

As a measuring device, my invention is useful to record lengths, as, for example, in the winding and spooling of thread. In this case the thread is unwound from the bobbin, and is passed several times around the pulley D, and from thence to the spools. Thus it turns the pulley in passing, and the length is recorded on the dial. As threads are of varying sizes and strength, it becomes necessary that the measuring device should be adapted to varying tensions. Hence the regulating-screw H is provided.

As a counting device, my invention is used to record vibrations or revolutions, as, for example, to register the amount of work turned out by a printing-press. In this case the oscillating arm drives the spindle, and registers the quantity of work done.

If the bracket B were rigidly connected with the standard A, the gearing of the registering mechanism could not be regulated for varying pressures or tensions, and when the cogs become worn they could not be readjusted or replaced. In my invention the bracket, being a separate piece and pivoted, as shown, admits of the adjustment of the gearing for different classes of work, and also of the ready removal and replacement of the parts. A further advantage of this adjustability of the bracket, and consequent removability of the dials, is, that the dials may be reset to the starting-point for a new reckoning. Hitherto the registration has been continuous, or, if the dials were reset to the zero-point, it has been by the tedious process of turning them back by hand.

I claim as a novel and useful invention, and desire to secure by Letters Patent—

1. The dial-bracket B, pivoted to the standard A, and keeping the registering mechanism in gear in proper engagement by the spring G, substantially as shown.

2. The regulating-screw H, in combination with the spring G, standard A, adjustable bracket B, and registering mechanism, substantially as and for the purpose specified.

3. The counting attachment herein described, consisting of the standard A, bracket B, spindle C, worm E, ratchet I, pawl J, oscillating arm K, springs G L, and a registering mechanism, substantially as described.

4. The combination of the standard A, bracket B, spindle C, pulley D, worm E, and a registering mechanism, together constituting a measuring device, substantially as described.

5. The combined counting and measuring attachment, herein described, consisting of the standard A, bracket B, spindle C, pulley D, worm E, ratchet I, pawl J, oscillating arm K, springs G L, and dials or registering mechanism, substantially as specified.

WM. HECKERT.

Witnesses:
E. W. WOODLEY,
WARREN R. PERCE.